March 18, 1958    T. B. CONNOR    2,827,087
RECIPROCATING NUT CRACKER
Filed May 3, 1956    2 Sheets-Sheet 1

Tod B. Connor
INVENTOR.

BY Clarence A. O'Brien
and Harvey B. Jackson
Attorneys

March 18, 1958 T. B. CONNOR 2,827,087
RECIPROCATING NUT CRACKER
Filed May 3, 1956 2 Sheets-Sheet 2

Tod B. Connor
INVENTOR.

BY *Clarence A. O'Brien*
*and Harvey B. Jackson*
Attorneys

United States Patent Office 2,827,087
Patented Mar. 18, 1958

2,827,087

RECIPROCATING NUT CRACKER

Tod B. Connor, Dallas, Tex.

Application May 3, 1956, Serial No. 582,462

7 Claims. (Cl. 146—16)

This invention relates to reciprocating nut crackers and particularly nut crackers of the type disclosed in my prior Patent No. 2,697,462.

An object of the present invention is to provide in a reciprocating jaw-type nut cracker an improved means for actuating the jaws with which one jaw may be adjusted along the beam which supports the jaws to a selected position while the other jaw is conveniently and easily reciprocated by a linkage which may be adjustably mounted on the same beam that supports the jaws.

A further object of the invention is to provide in a reciprocating jaw-type nut cracker a cover for the pocket between the jaws which accommodates the nuts, this cover being operatively connected with the jaws and adapted to direct the shells in one direction so that they are easily collected in a receptacle that is provided for this purpose. In this way the scattering of the shells in many directions is avoided making the use of the nut cracker more desirable from a cleanliness standpoint.

Another object of the invention is to provide a nut cracker with an ejection pin for the shells which become lodged in one of the jaws, this ejection pin becoming operative in response to movement of the jaw with which the ejector pin is connected.

Another object of the invention is to provide improvements in nut crackers and particularly nut crackers of the type which utilizes an approximately horizontal beam on which a pair of jaws are movable, these improvements making the use of the nut cracker more satisfactory, easier than prior nut crackers of which I am aware and providing for adjustments to accommodate nuts in sizes that vary through a large range.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 7:
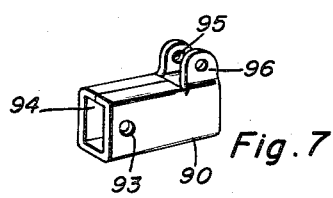
Figure 8:
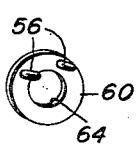

Figure 7 is a perspective view of a connector for the main operating lever of a linkage that is used to impart movement to the one of the jaws of the pair mounted on the beam; and Figure 8 is a perspective view of an orifice plate that is provided for a cavity in one of the jaws, there being a number of these plates having different sized orifices which are recommended to be used for nuts of different sizes and shapes.

In the drawings there is a table 10 or equivalent structure on which the clamp 12 is adapted to fasten. Clamp 12 consists of a C-clamp that includes a body, a screw 14, leg 16 of the body accommodating the screw while the leg 18 thereof has spindle 20 connected with it. Wing nut 22 on the spindle 20 holds plate 24 on leg 18 in selected position so that the beam 26 may be selectively positioned with respect to table 10.

Figure 1:
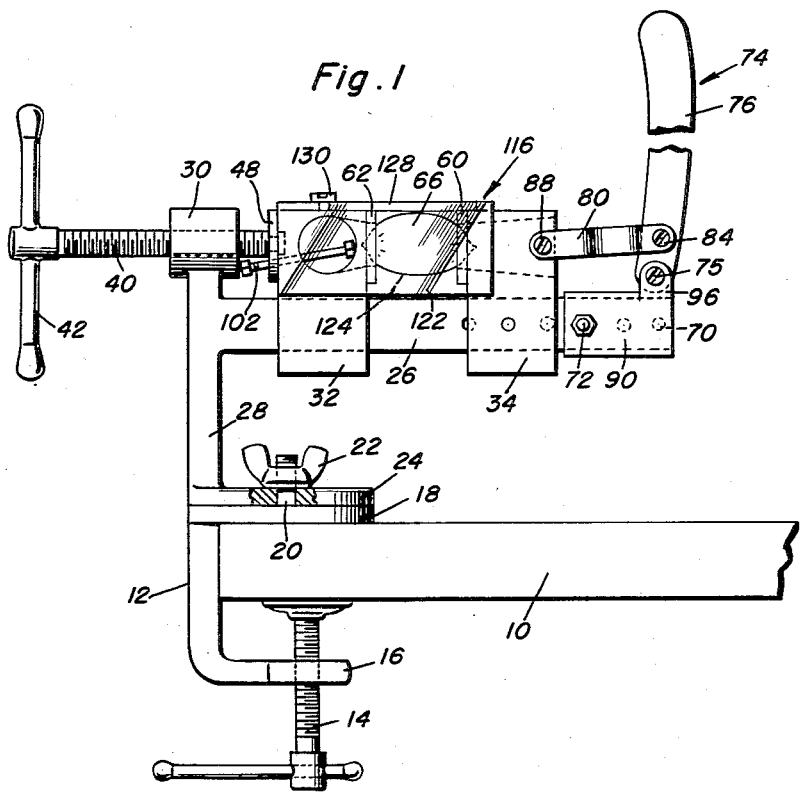
Figure 1 is an elevational view of a nut cracker which is made in accordance with the invention, the nut cracker being mounted on a table.
Figure 2:
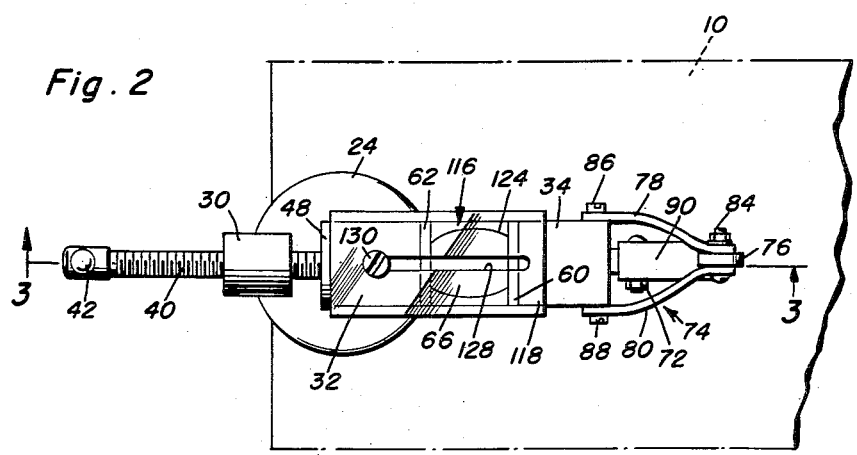
Figure 2 is a top view of the structure in Figure 1.
Figure 3:
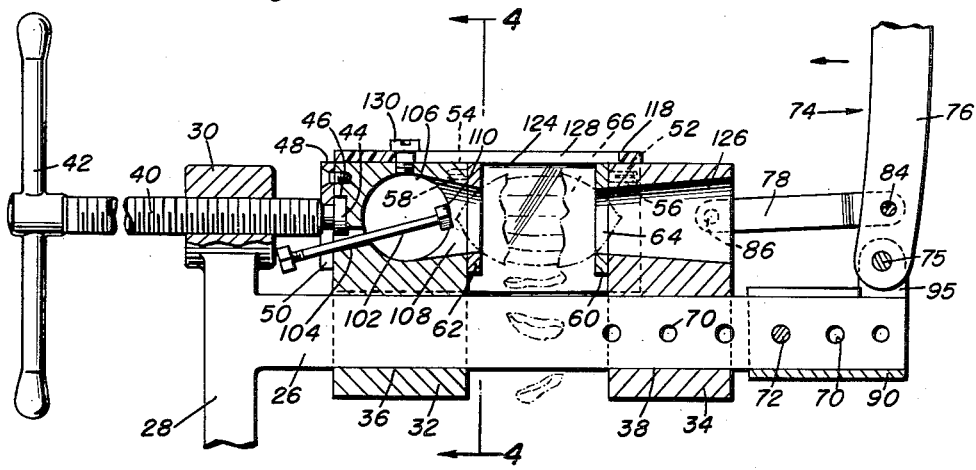
Figure 3 is a longitudinal sectional view taken approximately on the line 3—3 of Figure 2.
Figure 4:
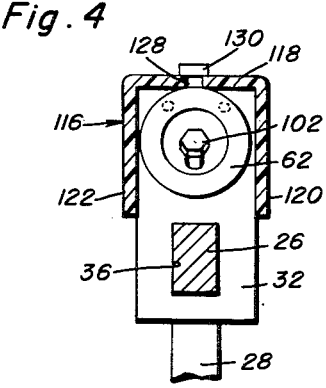
Figure 4 is a transverse sectional view taken approximately on the line 4—4 of Figure 3.
Figure 6:
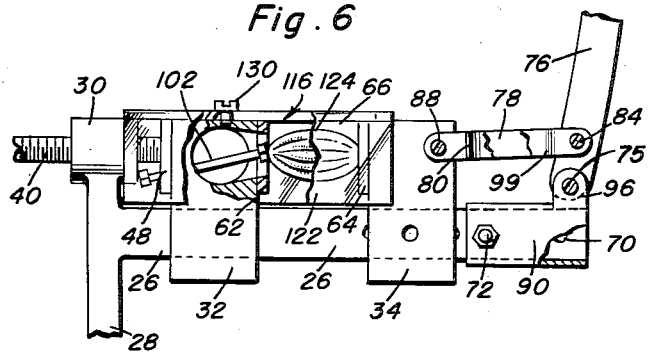
Figure 6 is an elevational view of the illustrated form of the invention.

An upright support 28 is fixed at its lower end to plate 24 and has the beam 26 projecting therefrom as a cantilever intermediate the ends. An internally threaded bearing 30 is fixed to the outer end of the upright support 28 and is located slightly above beam 28 when the beam is in the approximately horizontal position (Figure 1).

A pair of jaws 32 and 34 respectively are movably mounted on the beam 26. It is preferred that each jaw consist of a block through which passages, as passages 36 and 38 for the jaws 32 and 34, are formed. Beam 26 passes through these passages, whereby the jaws are mounted for sliding movement on the beam toward and away from each other. The jaw 32 is selectively positionable on the beam 26 and is held in that selected position during the operation of the nut cracker. Screw 40 is threaded in bearing 30 and has an operating handle 42 at the outer end thereof. The inner end of the screw is reduced and has an enlargement 44 at the end of the reduced part. This enlargement is located in a recess 46 in the outer face of jaw 32. Cover 48 is screwed or otherwise fastened to the outer face of jaw 32 and has a slot 50 through which the reduced part of screw 40 passes. This construction connects screw 40 to jaw 32 for rotation but imparts rectlinear movement to the jaw 32 in response to rotation of screw 40 in bearing 30.

The confronting faces of jaws 32 and 34 are provided with bores 52 and 54 in which the split pins 56 and 58 of orifice plates 60 and 62 are frictionally held. Each plate (Figure 8) has an orifice 64 in which to accommodate a nut, for example pecan 66. A number of such orifice plates which differ from each other in the orifice diameter are used to more adequately accommodate nuts of various sizes. In order to remove the orifice plates from the jaws it is necessary only to pry them from the jaws so that the split spring pins 56 are separated from their bores 52 and 54. Insertion of the new orifice plates is quite simple, it involving only the pressing of the plates against the confrontng faces of the jaws 32 and 34 with the split pins fitting in the bores 52 and 54.

After the desired position of the jaw 32 is selected by rotating screw 40, the jaw 34 is ready for actuation. For this purpose the actuating means are preferably selectively adjustable on beam 26. Therefore a number of apertures 70 are formed in the beam near the outer end thereof. One of these apertures is chosen for the pin 72. An easily operable linkage 74 forms part of the actuating means for jaw 34.

A sleeve 90 which is non-circular in cross-section, is fitted over the end of the beam 26 and is held in place by having a bolt 72 passed through aligned apertures 93 and 94 in its opposite sides and through a selected aperture 70 in beam 26. By selection of aperture 70 the position of sleeve 90 and linkage 74 on beam 26 may be adjusted. The rear end of the sleeve 90 has a pair of upstanding ears 95 and 96 in which there are apertures. A pivot pin 75, for example a bolt, is passed through the apertures in ears 95 and 96 and also through an opening at one end 97 of operating lever 76 of linkage 74. The remainder of linkage 74 comprises a pair of links 78 and 80 that are pivoted at their inner ends on a pivot pin, for example bolt 84, which is carried by lever 76, above pivot pin 75 and approximately in alignment with an axis extending through the centers of the orifice in the orifice plates. The inner ends of links 78 and 80 are pivotally connected to the sides of jaw 34, as by trunnions 86 and 88. Upon oscillation of the lever 76 the jaw 34 will be displaced on the beam 26 toward and away from the jaw 32 through the pushing and pulling action of links 78 and 80. Not only do ears 95 and 96 serve to mount lever 76, but they move its pivot axis close to the centerline of the nut to be cracked. This provides for high leverage.

An ejection pin 102 is operatively connected with the jaw 32. It passes through a passageway 104 formed in the jaw and in registry with the transverse shell opening 106 in the same jaw. The nut accommodating passage directly behind the orifice in orifice plate 62 is in the form of a truncated cone and has the outer, enlarged end 110 of the ejector pin 102 located therein. The opposite end, also enlarged, of the ejector pin abuts the front face of bearing 30 so that as the jaw 32 is moved toward bearing 30 the ejector pin 102 is held stationary whereby there is relative movement between the ejector pin and jaw 32 such that the ejector pin moves through the opening 108 and pushes any nut shells or other debris that is lodged therein outwardly through the orifice in orifice plate 62. Serving as a guide for the ejector pin 102 is cover 48 inasmuch as the ejector pin passes through the slot 50 of this plate.

Figure 5:
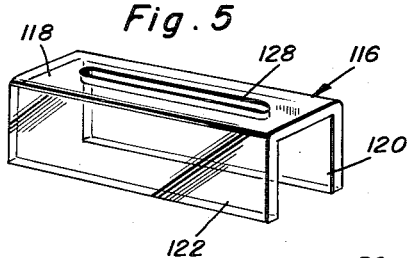
Figure 5 is a perspective view of the guard or cover which is used for deflecting the nut shells so that they are directed in a single place at which a pan or the like may be located.

A cover 116 is mounted on the nut cracker in order to form a guard. The guard consists of a substantially channel-shaped member (Figure 5) having a top wall 118 and two side walls 120 and 122 that are parallel to each other. It is preferred that the cover be made of a transparent material, for example polystyrene. In this way the events which transpire in the nut pocket 124 may be observed. The nut pocket 124 is considered to be the space between the jaws 32 and 34 and the openings in the orifice plates and jaws 32 and 34, for example 108 in jaw 32 and truncated conical opening 126 in jaw 34, wherein the nuts are held and cracked. The top wall 118 of the guard has a longitudinal slot 128 which coacts with a pin, for example bolt 130 in jaw 34, to hold the guard in place on the jaws 32 and 34 but permit the jaws to be removed with respect to each other on beam 26.

In operation the nut cracker is connected to a supporting surface so that the beam 26 is approximately horizontal. The sleeve 90 supporting lower end of lever 76 is adjusted on the beam 26 thereby positioning jaw 34 with respect to the jaw 32 in accordance with the size of nuts to be cracked. Jaw 32 is also adjustable and this adjustment may be made merely by adjusting screw 40. In either case the final decision is made by the user of the device, there being provided herein the two separate adjustments for the convenience of the user. Guard 116 is slid over jaw 32 in order to expose the nut pocket 124 from above. Assuming a proper selection of orifice plates 60 and 62 has been made previously, the nut 66 is placed in the orifices 64 and the lever 76 is actuated until the shells are cracked. Then the nut meat almost always intact is removable from the nut cracker with the shells of the nut being deflected by the guard 116 that is moved over the nut pocket prior to actuation of the lever 76 of linkage 74. This procedure is continued until all of the nuts are cracked. In the event jaw 32 should become clogged, the ejection pin 102 is used. The actuate the ejection pin it is necessary to adjust the jaw 32 on beam 26 by screw 40. Rotating this screw in such direction as to move the jaw toward the bearing 30 causes the ejection pin to move toward the orifice in orifice plate 62 and push any shells outwardly therefrom which may be lodged in the jaw 32. Then return rotation of the screw 40 will position the jaw 32 in readiment for further nut cracking operation.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A reciprocating nut cracker comprising a pair of jaws which are adapted to crack nuts therebetween, a beam on which said jaws are mounted, one of said jaws being movable with respect to the other, a transparent guard for the shells broken from the nuts and located adjacent to said jaws, said guard having a pair of walls on the sides of said jaws, a top wall located over said jaws, said top wall having a slot, and a fastener carried by one of said jaws and extending into said slot.

2. In a nut cracker which includes an approximately horizontal beam provided with a pair of spaced nut cracking jaws movably mounted thereon, the improvement comprising a screw connected to said beam and a first of said jaws to adjust the position of said first jaw, means including a lever selectively positionable on said beam for actuating the other of said jaws, a guard mounted over the space between said jaws, and nut ejection means for the nuts in one of said jaws and which are operable in response to movement of said screw.

3. In a nut cracker which includes an approximately horizontal beam provided with a pair of nut cracking jaws movably mounted thereon, the improvement comprising a screw connected to said beam and a first of said jaws to adjust the position of said first jaw, means including a lever selectively positionable on said beam for actuating the other of said jaws, and nut ejection means for one of said jaws operable in response to movement by said screw.

4. A nut cracker comprising an approximately horizontal beam of non-circular cross-section, a pair of jaws, each jaw having a passage of a cross-section which is similar to the cross-section of said beam and mounted for movement on said beam by having said beam passed through said passages, a nut pocket between said jaws and including openings in said jaws in which to accommodate opposite ends of the nuts, means for adjusting the position of a first of said jaws on said beam and including a screw, a bearing in fixed position with respect to said beam, said screw being mounted for rotation in said bearing and operatively connected to said first of said jaws to displace said first of said jaws on said beam, ejection means for the opening in said first of said jaws and operable in response to movement of said first of said jaws in one direction on said beam, and means operatively connected to said beam and the other of said jaws for actuating the other of said jaws.

5. A nut cracker comprising an approximately horizontal beam of non-circular cross-section, a pair of jaws, each jaw having a passage of a cross-section which is similar to the cross-section of said beam and mounted for movement on said beam by having said beam passed through said passages, a nut pocket between said jaws and including openings in said jaws in which to accommodate opposite ends of the nuts, means for adjusting the position of a first of said jaws on said beam and including a screw, a bearing in fixed position with respect to said beam, said screw being mounted for rotation in said bearing and operatively connected to said first of said jaws to displace said first of said jaws on said beam, ejection means for the opening in said first of said jaws and operable in response to movement of said first of said jaws in one direction on said beam, and means operatively connected to said beam and the other of said jaws for actuating the other of said jaws including a linkage pivoted to said other of said jaws, and means mounting said linkage for pivotal movement on said beam.

6. The nut cracker of claim 4 wherein said ejection means includes a pin having an end which contacts said bearing when said first of said jaws is moved in a direction toward said bearing by said screw.

7. A reciprocating nut cracker comprising a pair of jaws that are adapted to crack nuts therebetween, a beam on which said jaws are mounted, one of said jaws movable with respect to the other, a guard for the shells broken from the nuts and located adjacent to said jaws, said guard having a pair of walls on the sides of said jaws together with a top wall located over said jaws, said top wall having a slot, and a fastener carried by one of said jaws and extending into said slot.

References Cited in the file of this patent

UNITED STATES PATENTS

| | | |
|---|---|---|
| 1,194,592 | Blair | Aug. 15, 1916 |
| 1,665,557 | Miller | Apr. 10, 1928 |
| 2,085,262 | Ferney | June 29, 1937 |
| 2,294,358 | Aber | Sept. 1, 1942 |
| 2,505,538 | Gehrke | Apr. 25, 1950 |
| 2,695,642 | White | Nov. 30, 1954 |
| 2,697,462 | Connor | Dec. 21, 1954 |
| 2,731,994 | Snell | Jan. 24, 1956 |
| 2,740,439 | Dillard | Apr. 3, 1956 |
| 2,783,803 | Fontaine | Mar. 5, 1957 |